United States Patent [19]
Boehmke

[11] B 3,925,011
[45] Dec. 9, 1975

[54] EMULSIFYING CARRIER COMPOSITIONS AND PROCESS FOR EMULSIFYING CARRIERS CONTAINING HYDROXYARYL GROUPS

[75] Inventor: Gunther Boehmke, Leverkusen-Grossendriesch, Germany

[73] Assignee: Bayer Aktiengesellschaft, Leverkusen-Bayerwerk, Germany

[22] Filed: Aug. 24, 1972

[21] Appl. No.: 283,300

[44] Published under the Trial Voluntary Protest Program on January 28, 1975 as document no. B 283,300.

[30] Foreign Application Priority Data
Aug. 24, 1971  Germany........................... 2142318

[52] U.S. Cl............................ 8/169; 8/21 C; 8/173; 252/312; 252/354
[51] Int. Cl.$^2$...................... D06P 5/04; B01F 17/12
[58] Field of Search ............ 252/354, 121; 8/89, 92, 8/169

[56] References Cited
UNITED STATES PATENTS

| | | | |
|---|---|---|---|
| 2,069,215 | 2/1937 | Chambers | 8/89 X |
| 2,683,692 | 7/1954 | Harris | 252/354 X |
| 2,991,145 | 7/1961 | Teot | 8/89 X |
| 3,561,915 | 2/1971 | Matalon | 8/89 X |

*Primary Examiner*—Richard D. Lovering
*Attorney, Agent, or Firm*—Plumley & Tyner

[57] ABSTRACT

Process and agents for emulsifying carriers (dyeing accelerators) containing hydroxyaryl groups The agents being mixtures of
a. alkali metal salts and/or ammonium salts of saturated or unsaturated fatty acids substituted by 1, 2 or 3 hydroxyl groups and
b. alkali metal salts, alkaline earth metal salts and/or ammonium salts of organic sulphonic acids possessing at least 10 C atoms and yielding without use of additional auxiliaries emulsions of fine particle size, which are stable to boiling and insensitive to electrolytes and do not tend to foam.

6 Claims, No Drawings

EMULSIFYING CARRIER COMPOSITIONS AND PROCESS FOR EMULSIFYING CARRIERS CONTAINING HYDROXYARYL GROUPS

The invention concern agents for emulsifying carriers containing hydroxyaryl groups; more particularly it relates to the use of mixtures of a. alkali metal salts and/or ammonium salts of saturated or unsaturated fatty acids substituted by 1, 2 or 3 hydroxyl groups and b. alkali metal salts, alkaline earth metal salts and/or ammonium salts of organic sulphonic acids possessing at least 10 C atoms.

As examples of representatives of the saturated or unsaturated fatty acids substituted by 1, 2 or 3 hydroxyl groups there may be mentioned: $C_{12}$-$C_{23}$-carboxylic acids substituted by 1, 2 or 3 hydroxyl groups, such as monohydroxystearic acid, 9, 10-dihydroxystearic acid, trihydroxystearic acid, dihydroxydocosanoic acid and ricinoleic acid; their possible alkali metal salts are especially the sodium and potassium salts and their possible ammonium salts are especially the ammonium and hydroxyalkylammonium salts, such as the monoethanolammonium, diethanolammonium and triethanolammonium salt.

As examples of representatives of the organic sulphonic acids possessing at least 10 C atoms there may be mentioned: alkylsulphonic acids, such as $C_{12}$-$C_{16}$-paraffinsulphonic acids; alkylbenzenesulphonic acids, such as n-dodecylbenzenesulphonic acid and n-tetradecylbenzenesulphonic acid; alkylnaphthalenesulphonic acids, such as diisobutylnaphthalenesulphonic acid; alkyl-diphenyl-ether-mono- and -di-sulphonic acids, such as dodecyl-diphenyl-ether-disulphonic acid; $\alpha$-olefinesulphonic acids, such as $C_{12}$-, $C_{14}$- and $C_{16}$-alk-1-ene-1-sulphonic acids; $\alpha$-sulphofatty acids, such as $\alpha$-sulpholauric acid, $\alpha$-sulphomyristic acid, $\alpha$-sulphopalmitic acid and $\alpha$-sulphostearic acid, and also the $C_1$-$C_6$-alkyl esters of these $\alpha$-sulpho-fatty acids; further, sulphonic acids of which the alkyl chain is interrupted by heteroatoms, such as oleoyl-tauride, oleoyl-methyl-tauride and ricinoleoyl-methyl-tauride.

The mixtures to be used according to the invention can be manufactured by mixing the appropriate salts, optionally at elevated temperatures, for example 50° - 70°C. In cases in which the sulphonic acids and also the mixtures of the sulphonic acids with the hydroxy-fatty acids are water-soluble it can be more advantageous to mix the free acids with one another and subsequently to convert the mixtures into the salts by neutralisation.

As carriers containing hydroxyaryl groups there may especially be mentioned: o-, m- and p-hydroxydiphenyl, o-, m- and p-benzylphenol; o-, m- and p-($\alpha$-phenyl)-ethyl-phenol; benzylcresols; $\alpha$-(phenyl)-ethyl-chlorophenols; phenylchlorophenols; and also cresotic acid esters, such as p-cresotic acid methyl ester.

Using the mixtures of anionic emulsifiers to be employed according to the invention, formulations of carriers, containing hydroxyaryl groups, which possess excellent activity can be manufactured. On pouring these carrier formulations into the dyebath, a spontaneous emulsification takes place, and the quality of the emulsion is independent of whether the carrier is added at any particular point of the dyebath, with substantial turbulence or with relative quiescence. The emulsions possess excellent stability.

In some cases it has proved advantageous, for the manufacture of liquid and cold-stable formulations of carriers containing hydroxyaryl groups, to add, additionally to the mixtures of the anionic emulsifiers to be used according to the invention, organic solvents, for example aliphatic and cycloaliphatic alcohols and ketones, such as methanol, ethanol, isopropanol, cyclohexanol, methylcyclohexanol or cyclohexanone, or aromatic hydrocarbons, such as benzene, toluene, xylene and isopropylbenzene, but especially those organic solvents which are of low volatility in steam and themselves possess carrier properties, for example the benzoic acid esters of methyl, ethyl, propyl, butyl and benzyl alcohol or the corresponding esters of the substituted benzoic acids, for example of chlorobenzoic acid, as well as diphenyl-ether, phthalic acid dialkyl esters and methylnaphthalenes.

The quantity ratios in which the two components a) and b) are present in the mixtures to be used according to the invention can vary within wide limits; it has proved advantageous if a:b are in ratios of 25:75 - 80:20, preferably 40:60 - 60:40.

Mixtures of a) sodium ricinolate and b) sodium n-dodecylbenzenesulphonic acid (technical mixture) have proved particularly appropriate, especially if these mixtures are 40:60 - 60:40 mixtures of the components a) and b).

The mixtures to be used according to the invention are employed in an amount of 3 to 30, preferably 3 to 15, percent by weight relative to the weight of the carriers containing hydroxyaryl groups or, if the carrier formulations additionally contain further water-immiscible components, such as organic water-immiscible solvents, relative to the weight of the total water-immiscible organic compounds contained in the carrier composition.

The carriers containing hydroxyaryl groups formulated by means of the emulsifier mixtures to be used according to the invention are employed in dyeing polyester textile materials with dispersion dyestuffs and cationic dyestuffs. As polyesters there may above all be mentioned: polyethylene terephthalate, polycyclohexanediethylene terephthalate, mixed polyesters of terephthalic acid, isophthalic acid and ethylene glycol or with admixtures of sulphoisophthalic acid, and also copolyether-esters of p-($\beta$-hydroxyethoxy)-benzoic acid, terephthalic acid and ethylene glycol, as well as cellulose triacetate and polycarbonates.

Suitable dispersion dyestuffs for dyeing the polyester materials are described, for example, in Colour Index, 2nd. edition, (1956), volume 1, pages 1655 - 1742.

It should be emphasised that the carriers containing hydroxyaryl groups which have been emulsified by means of the mixtures to be employed according to the invention are particularly suitable for dyeing polyester-wool mixtures, since they effectively prevent the soiling of the wool fibre by the dispersion dyestuffs.

It is already known to use emulsifiers for the fine distribution of carriers in dyebaths, and in particular non-ionic, anionic and mixtures of non-ionic and anionic emulsifiers have been employed. The non-ionic emulsifiers display a good emulsifying action for carriers but suffer from the disadvantage that they heavily retain the dyestuffs, so that the exhaustion of the dyebaths is poor. The emulsifying action of the anionic emulsifiers for carriers is not good so that in order to achieve an adequate action the emulsifiers must be used in major amounts. In order to balance the disadvantages of the two types of emulsifier, the practice had become to employ mixtures of non-ionic and anionic emulsifiers for emulsifying carriers. Effective carrier compositions were obtained in this way, though only for carrier formulations which either contain no carriers possessing hydroxyaryl groups or only a small proportion of such carriers. The known mixed emulsifiers cannot be used for emulsifying carriers which contain more than 20 percent by weight of carrier compounds containing hydroxyaryl groups, because these emulsifiers do not give oil-in-water emulsions of the carriers but only water-in-oil emulsions. Attempts have therefore been made to emulsify carriers containing hydroxyaryl groups, or carrier mixtures wherein the content of carriers containing hydroxyaryl groups is greater than 20 percent by weight, by means of anionic emulsifiers and other auxiliaries, for example special solvents (compare DAS 1,083,224). Alternatively, o-hydroxydiphenyl formulations have been recommended which contain major amounts of glycols and polyvinyl alcohol in addition to the anionic emulsifier. However, these compositions can only be distributed in a dye-bath after preparation of a stock emulsion which must contain further surface-active agents, and furthermore do not give any highly stable emulsions.

Using the mixtures to be employed according to the invention, formulations of carriers containing hydroxyaryl groups are for the first time obtained which without the additional use of other auxiliaries give emulsions of fine particle size, which are stable to boiling and insensitive to electrolytes and additionally produce little foam. Further advantageous properties, which represent an advance, of the mixtures to be used according to the invention, which should be singled out, are that their action remains the same in hard and soft water and that they possess an excellent levelling capacity for dispersion dyestuffs and do not exert a retaining action on these dyestuffs when absorbed from the dyebaths.

In the examples which follow, the parts indicated are parts by weight; the structures of dyestuffs I to III are grouped together in the table at the end of the examples.

EXAMPLE 1

The following carrier formulation is produced by mixing the components at 50° – 60°C:

70 parts of α-phenylethylphenol (predominantly consisting of the o-isomers)
10.5 parts of water
5 parts of sodium n-dodecylbenzenesulphonate and
6.5 parts of sodium ricinolate. 5 g of this opalescent, transparent liquid carrier are poured into 2,000 ml of water which has been heated to 50° – 60°C and adjusted to pH 4.5 – 5 with acetic acid. A stable milky emulsion is obtained, which shows no separation of oil whatsoever even on prolonged standing.

A fabric of polyethylene glycol terephthalate fibres is introduced, in the liquor ratio of 1:40, into this bath and agitated therein for approx. 15 minutes. An aqueous dispersion of 2 g of the dispersion dyestuff 1-hydroxy-4-(p-toluidino)-anthraquinone, formulated with customary dispersing agents, is then added. Dyeing is carried out for 2 hours at approx. 98°C. The dyeing shows excellent evenness and no carrier blotches even under unfavourable conditions of dyeing liquor agitation and material agitation.

EXAMPLE 2

The following carrier formulation is manufactured by mixing the components at 50° – 60°C:

45 parts of o-hydroxydiphenyl
10 parts of diphenylene oxide
5 parts of o-cyclohexylphenol
20 parts of xylene
5 parts of water
5 parts of isopropanol
5 parts of sodium n-dodecylbenzenesulphonate and
5 parts of sodium ricinolate.

6 g of this clear mixture are poured into 2,000 ml of water warmed to 50° – 60°C. A highly stable emulsion is obtained whether soft or hard water is used. A polyethylene glycol terephthalate fibre fabric is introduced into the emulsion in the liquor ratio of 1:40 and agitated therein for about 15 minutes. The aqueous suspension of a mixture of the commercially formulated dyestuffs 2 g of 4,8-diamino-1,5-dihydroxyanthraquinone and
2 g of dyestuff No. 12,790 (Colour Index, 2nd. edition (1956), volume 3) is then added.

Dyeing takes place for 2 hours at approx. 98°C. A deep green dyeing of excellent evenness is obtained.

If the dyeing is interrupted after a shorter dyeing time, dyeings are obtained which display a lesser colour depth but the same colour shade. These experiments show that the carrier formulation does not display differing retention towards the individual dyestuffs and possesses an excellent levelling capacity towards different dyestuffs.

Equivalent dyeings and identical experimental results were also obtained if, instead of the mixture of 45 parts of o-hydroxydiphenyl, 10 parts of diphenylene oxide and 5 parts of o-cyclohexylphenol, 60 parts of o-hydroxydiphenyl were employed in the carrier formulation.

EXAMPLE 3

The following components are mixed with one another at 60° – 70°C:

60 parts of o-hydroxydiphenyl
28 parts of water
6 parts of sodium ricinolate and
6 parts of the monosodium salt of dodecyl-diphenylether-disulphonic acid.

The resulting carrier formulation is an opalescent liquid which on cooling solidifies to a paste. Before use, this paste is melted at 60° – 65°C and then added as a liquid to the dyebath. By means of this carrier formulation, a dyebath with particularly little foam is obtained, which is especially suitable for machine dyeing.

A mixed fabric of 55 parts of polyethylene terephthalate and 45 parts of wool is introduced, in a liquor ratio of 1:20, into a dyebath at 60°C which contains, per litre, 1.4 g of dyestuff No. III in a finely dispersed form and in which, before heating it further, 5 g of the carrier formulation described above have been emulsified at 50° – 60°C. After dyeing for 1½ hours at 98° – 100°C, the mixed fabric is washed with a non-ionic detergent (2 g/l of a nonylphenol-polyglycolether) and is subsequently after-treated in a bath at 85°C which contains, per litre 2.0 g of sodium dithionite
2.5 g of sodium hydroxide solution of 38° Be strength and 0.75 g of the reaction product of 1 mol of oleyl alcohol and 17 mols of ethylene oxide.

A mixed fabric wherein the polyester constituent is dyed deep blue and the wool constituent is clear and clean is obtained.

EXAMPLE 4

A carrier formulation which is advantageous because of its low tendency to foaming is obtained by mixing the following components:

- 50 parts of o-hydroxydiphenyl
- 30 parts of benzyl benzoate
- 5 parts of water
- 5 parts of ethanol
- 5 parts of sodium ricinolate and
- 5 parts of sodium n-dodecylbenzenesulphonate (or sodium $\alpha$-$C_{10}$-$C_{14}$-olefinesulphonate)

The low tendency to foaming of the sodium ricinolatesodium dodecylbenzenesulphonate mixture to be used according to the invention manifests itself clearly on comparing the foam indices of the mixture with those of sodium n-dodecylbenzenesulphonate. The determination was carried out by the Schlachter foam-whipping method:

| 1.5 g of Na Alkylbenzenesulphonate/l at 22°C in | | | |
| --- | --- | --- | --- |
|  | soft water | hard water | (16° of German hardness) |
| immediately | 1,250 ccs. | 1,100 ccs. | |
| 1 minute | 1,200 ccs. | 1,100 ccs. | |
| 3 minutes | 1,200 ccs. | 1,050 ccs. | |
| 5 minutes | 1,150 ccs. | 1,050 ccs. | |
| 1.5 g of the Emulsifier Mixture | | | |
| immediately | 650 ccs. | 250 ccs. | |
| 30 seconds | 0 ccs. | 0 ccs. | |

8 g of the carrier mixture mentioned are poured into 1 litre of water at 55°C, without pre-emulisification. 3 g of a dispersing agent (the sodium salt of the condensation product of naphthalenesulphonic acid with formaldehyde) and

- 0.2 g of Dyestuff I
- 0.25 g of Dyestuff II
- 0.25 g of Dyestuff III in a finely disperse form are added to the resulting fine emulsion. A fabric of thermofixed polyester is introduced into the dyebath thus prepared, using a liquor ratio of 1:20. The bath is heated to 98°C and dyeing is carried out for 60 minutes at this temperature. A strong brown dyeing of excellent evenness is obtained.

Structures of the dyestuffs I, II and III used in the examples

I. 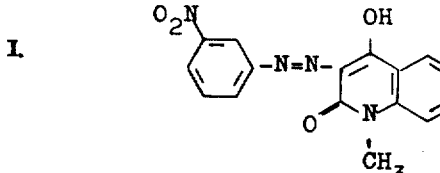

II. 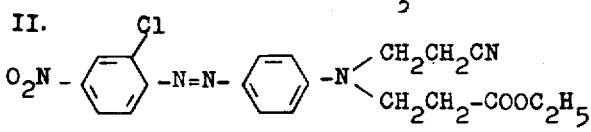

III. 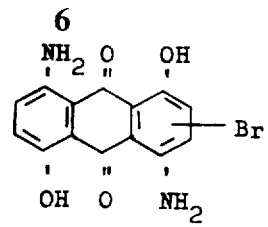

I claim:

1. In the known process for emulsifying carriers (dyeing accelerators) containing hydroxyaryl groups selected from the group consisting of o-, m- and p-hydroxydiphenyl; o-, m- and p-benzylphenol; o-, m- and p-($\alpha$-phenyl)-ethyl-phenol; benzylcresols; $\alpha$-(phenyl)-ethyl-chlorophenols; phenylchlorophenols, and cresotic acid esters in aqueous dyeing baths by means of emulsifiers the improvement which comprises using as the emulsifier a mixture consisting essentially of
    a. alkali metal salts and/or ammonium salts of saturated or unsaturated fatty acids substituted by 1, 2 or 3 hydroxyl groups, and
    b. alkali metal salts, alkaline earth metal salts and/or ammonium salts of organic sulphonic acids possessing at least 10 C atoms, and wherein components (a) and (b) of the said mixture are present in a weight ratio of 15 : 75 to 80 : 20 and wherein said mixture is employed in an amount of 3 to 30 percent by weight relative to the weight of the carrier.

2. Process according to claim 1 wherein components (a) and (b) of the emulsifier-mixture are in a weight ratio of 40:60 to 60:40.

3. Process according to claim 1 wherein component (a) is sodium ricinolate and component (b) is sodium dodecylbenzene sulphonate.

4. An emulsifying carrier composition consisting essentially of (1) a hydroxyaryl group-containing carrier selected from the group consisting of o-, m- and p-hydroxydiphenyl; o-, m- and p-benzylphenol; o-, m- and p-($\alpha$-phenyl)-ethyl-phenol; benzylcresols; $\alpha$-(phenyl)-ethyl-chlorophenols; phenylchlorophenols, and cresotic acid esters and (2) a mixture of : (1) a material selected from the group consisting of: (a) alkali metal salts and ammonium salts of saturated and unsaturated fatty acids substituted by 1–3 hydroxyl groups; and (b) alkali metal salts, alkaline earth metal salts and ammonium salts of organic sulfonic acids possessing at least 10 carbon atoms, the components (a) and (b) are in a weight ratio of from about 15:75 to 80:20 and wherein said mixture is employed in an amount of 3 to 30% by weight relative to the weight of the carrier.

5. The emulsifying carrier composition according to claim 4 wherein components (a) and (b) are in a weight ratio of 40:60 to 60:40.

6. The emulsifying carrier composition according to claim 4 wherein component (a) is sodium ricinolate and component (b) is sodium dodecylbenzene sulphonate.

* * * * *